US012042914B2

(12) United States Patent
Jaskot et al.

(10) Patent No.: US 12,042,914 B2
(45) Date of Patent: Jul. 23, 2024

(54) DRY-FIRE BYPASS FOR A FASTENING TOOL

(71) Applicant: Black & Decker, Inc., New Britain, CT (US)

(72) Inventors: Erin Elizabeth Jaskot, Richmond, VA (US); Michael P. Baron, Phoenix, MD (US); Stuart E. Garber, Towson, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 17/846,823

(22) Filed: Jun. 22, 2022

(65) Prior Publication Data

US 2022/0314410 A1 Oct. 6, 2022

Related U.S. Application Data

(63) Continuation of application No. 15/629,871, filed on Jun. 22, 2017, now Pat. No. 11,400,572.

(60) Provisional application No. 62/356,973, filed on Jun. 30, 2016.

(51) Int. Cl.
*B25C 1/00* (2006.01)
*B25C 1/06* (2006.01)

(52) U.S. Cl.
CPC ................ *B25C 1/008* (2013.01); *B25C 1/06* (2013.01)

(58) Field of Classification Search
CPC .. B25C 1/008; B25C 7/00; B25C 1/04; B25C 1/06
See application file for complete search history.

(56) References Cited

U.S. PATENT DOCUMENTS

2012/0085806 A1* 4/2012 Lee ......................... B25C 1/008 227/8
2013/0320068 A1* 12/2013 Gregory .................. B25C 1/005 227/139
2014/0076952 A1* 3/2014 Garber ...................... B25C 1/06 227/129

* cited by examiner

*Primary Examiner* — Veronica Martin
(74) *Attorney, Agent, or Firm* — Rhonda Barton

(57) ABSTRACT

A fastening tool includes a contact trip operatively associated with a contact trip switch to enable a fastener drive system to be fired when the contact trip reaches a firing position, after having engaged a work surface. If a dry-fire condition exists in a magazine connected to the fastening tool, the movement of the contact trip is completely taken up or absorbed by a biasing agent so that the contact trip switch is not closed. The biasing agent also limits the amount of force that can be applied to the contact trip switch in the event an operator slams the contact trip against a work surface or drops the fastening tool nose-first onto an unyielding surface.

15 Claims, 11 Drawing Sheets

DRY-FIRE BYPASS FOR A FASTENING TOOL

CROSS-REFERENCE TO RELATED APPLICATIONS

The present application is a continuation of U.S. patent application Ser. No. 15/629,871, filed Jun. 22, 2017, entitled "Dry-Fire Bypass For a Fastening Tool" which claims priority under 35 U.S.C. § 119 to U.S. Provisional Application Ser. No. 62/356,973 filed on Jun. 30, 2016. The entirety of these applications are herein incorporated by reference.

BACKGROUND OF THE INVENTION

1. Field of the Invention

The present invention relates to fastening tools, and more particularly to fastening tools with fastener magazines, and having contact trips engageable with a work surface to enable the fastening tools to fire a fastener.

2. Description of the Related Art

Fastening tools, such as concrete nailers, staplers, and other milers, are normally provided with fastener magazines. Typically, fasteners loaded in the magazine are biased toward a drive track of the fastening tool, so that the fastening tool drive system can drive a fastener into a work surface. However, if the supply of fasteners in the magazine becomes exhausted or "dry" when the fastening tool is fired, the driver of the drive system encounters no resistance as the driver is fired along the drive track, until the driver ultimately engages some other portion of the fastening tool, or even the work surface via the contact trip. This condition is called a "dry-fire", and is highly destructive to fastening tool mechanisms.

To date, conventional attempts to solve the problem have been unsatisfactory for several reasons. One reason is that many conventional dry-fire avoidance systems freeze a lower contact trip so that the lower contact trip is unable to move even if the lower contact trip is thrust against a work surface, an event which places additional stresses on the contact trip system.

Another reason is that conventional dry-fire avoidance systems often position the contact trip off-center from the fastening tool drive axis, which creates a moment arm with the contact trip. Consequently, when an operator slams the contact trip against a work surface, or drops the fastening tool, nose first, onto an unyielding surface, like concrete, the shock is amplified and transmitted throughout the entire contact trip system.

Conventional contact trip systems include three major elements: a contact trip, a dry-fire avoidance system, and a fastener drive system arming device. The fastener drive system arming device is linked to the contact trip so that, when the contact trip moves to a firing position after having engaged the work surface, the fastener drive system arming device assumes a firing condition enabling the fastener drive system, which is now armed, to drive a fastener. Then, when an operator pulls a trigger switch on the fastening tool, the fastening tool can fire a fastener. However, the vulnerability of conventional contact trip systems to being slammed or dropped significantly reduces the lifetimes of conventional arming devices.

Still another reason why conventional dry-fire avoidance systems have proven unsatisfactory is that, in electrically-driven fastening tools, the fastener drive system arming device often includes a relatively fragile contact trip switch, which is closed by a linkage actuated by the contact trip when the contact trip moves to the firing position. The contact trip switch is electrically connected to the fastener drive system so that, when the contact trip closes the contact trip switch, the fastener drive system arming device assumes the firing condition, and an operator can fire the fastening tool. However, conventional fastening tools include no systems for limiting the force exerted upon the contact trip switch when the contact trip is shoved against a work surface, even during normal operating conditions when the magazine is loaded with fasteners.

The problems enumerated above still exist in fastener drive system arming devices connected mechanically or otherwise to other types of fastener-driving systems, such as pneumatic, explosive-gas, or hydraulic. Impact forces exerted upon the lower portion of a contact trip assembly are still directly transmitted to the fastener drive system arming device.

Consequently, existing fastening tools are vulnerable both to dry-fire conditions and to shocks caused by the operator slamming the tool against a work surface, or dropping the tool nose-first onto an unyielding surface, like concrete. What is needed, therefore, is a fastening tool that both handles dry-fire conditions, and insulates an arming device from the forces exerted upon the arming device by a contact trip.

SUMMARY OF THE INVENTION

Accordingly, in one embodiment of the fastening tool of the present invention, the contact trip is moved to bypass a fastener drive system arming device. A biasing agent, such as a coil spring, is placed between the upper portion of the contact trip and the fastener drive system arming device. The coil spring allows the contact trip to move the entire distance the contact trip normally travels to reach the firing position, while taking up or absorbing the force that the contact trip would normally expend on the arming device. This arrangement yields several benefits.

One benefit of moving the contact trip to bypass the fastener drive system arming device is that the amount of force which is ultimately applied to an element of the fastener drive system arming device, namely a contact trip switch, can be limited by configuring the coil spring to be, in effect, a force take-up member. For example, in an electrically-driven fastening tool of the present invention, it is desirable that the contact trip switch survive hundreds of thousands of connections during the lifetime of the fastening tool. By configuring the coil spring to limit the force ultimately applied to the contact trip switch to two pounds or less, the contact trip switch will survive hundreds of thousands of connections, no matter how hard the operator slams the contact trip against a work surface, and no matter how many times the fastening tool is dropped.

Another benefit of moving the contact trip to bypass the fastener drive system arming device is that the coil spring acts as a distance take-up member, causing the contact trip to bypass direct engagement with the contact trip switch in response to a "bypass event". Such an event can include, for example, the fastener magazine reaching a dry-fire condition, in which the coil spring can be compressed to take up or absorb the entire distance that the contact trip travels to reach the firing position, without the contact trip engaging the arming device.

Yet another benefit of the bypass system of the present invention is that the system permits the contact trip to be disposed in the fastening tool housing coaxially with the fastening tool drive axis. Therefore, a lower portion of the fastening tool housing can now act as a "hard stop" against which a toe of the contact trip is driven if the contact trip is ever slammed against the concrete, or the fastening tool is dropped nose-first. Thus the inherently rugged fastening tool housing itself takes the shock, rather than the more fragile elements of the contact trip switch, which are simultaneously protected by the force-limiting action of the coil spring. The hard stop eliminates the shock-amplifying arrangement of conventional dry-fire avoidance systems that position the contact trip off-center from the drive axis.

The bypass system of the present invention is implemented by disposing the coil spring in a biasing agent housing between a plate or appendage connected for joint movement with an upper part of the contact trip, and an upper inner surface, or roof, of the biasing agent housing. The coil spring also normally biases the biasing agent housing in a direction to engage the fastener drive system arming device. Thus, as the contact trip moves upwardly in response to having engaged a work suffice, it carries with it the appendage, which in turn pushes the coil spring upwardly in the biasing agent housing, thereby pushing the biasing agent housing upwardly as well. When the contact trip reaches the uppermost point in its travel (its firing position), the biasing agent housing engages a switch lever, which pivots to close the contact trip switch. The switch lever and contact trip switch collectively form the fastener drive system arming device.

On the other hand, if a dry-fire condition were to occur in the fastener magazine, a fastener pusher probe disposed in the fastener magazine blocks the biasing agent housing from moving upwardly. If an operator nevertheless were to cause the contact trip to engage a work surface, the contact trip will still move upwardly toward the firing position. As the contact trip moves upwardly, the contact trip again carries the appendage, which in turn pushes the coil spring upwardly. However, (inasmuch as the biasing agent housing is configured to permit relative movement between the biasing agent housing and the appendage, and inasmuch as upward movement of the biasing agent housing has been blocked), the upward movement of the contact trip will not close the contact trip switch. Instead, continued joint upward movement of the contact trip-appendage combination results in the coil spring being compressed inside the biasing agent housing, which still remains stationary. Thus, the coil spring takes up or absorbs the distance that the contact trip would normally travel to reach the firing position, thereby causing the upward movement of the contact trip to bypass the contact trip switch, but allowing the contact trip to move the entire distance the contact trip needs to travel to reach the firing position.

In another embodiment, the magazine fastener pusher probe pushes the biasing agent housing laterally away from the line of vertical movement the biasing agent housing would normally take to engage the switch lever, in response to the quantity of fasteners in the magazine having reached a minimum. When the magazine is fully loaded, the pusher is retracted and a return spring returns the biasing agent housing to a position in which the biasing agent housing is engageable with the switch lever. If desired, a force take-up member, such as another coil spring, may be operatively disposed between the biasing agent housing and the appendage to limit the force applied by the biasing agent housing against the switch lever.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE INVENTION

Figure 1:
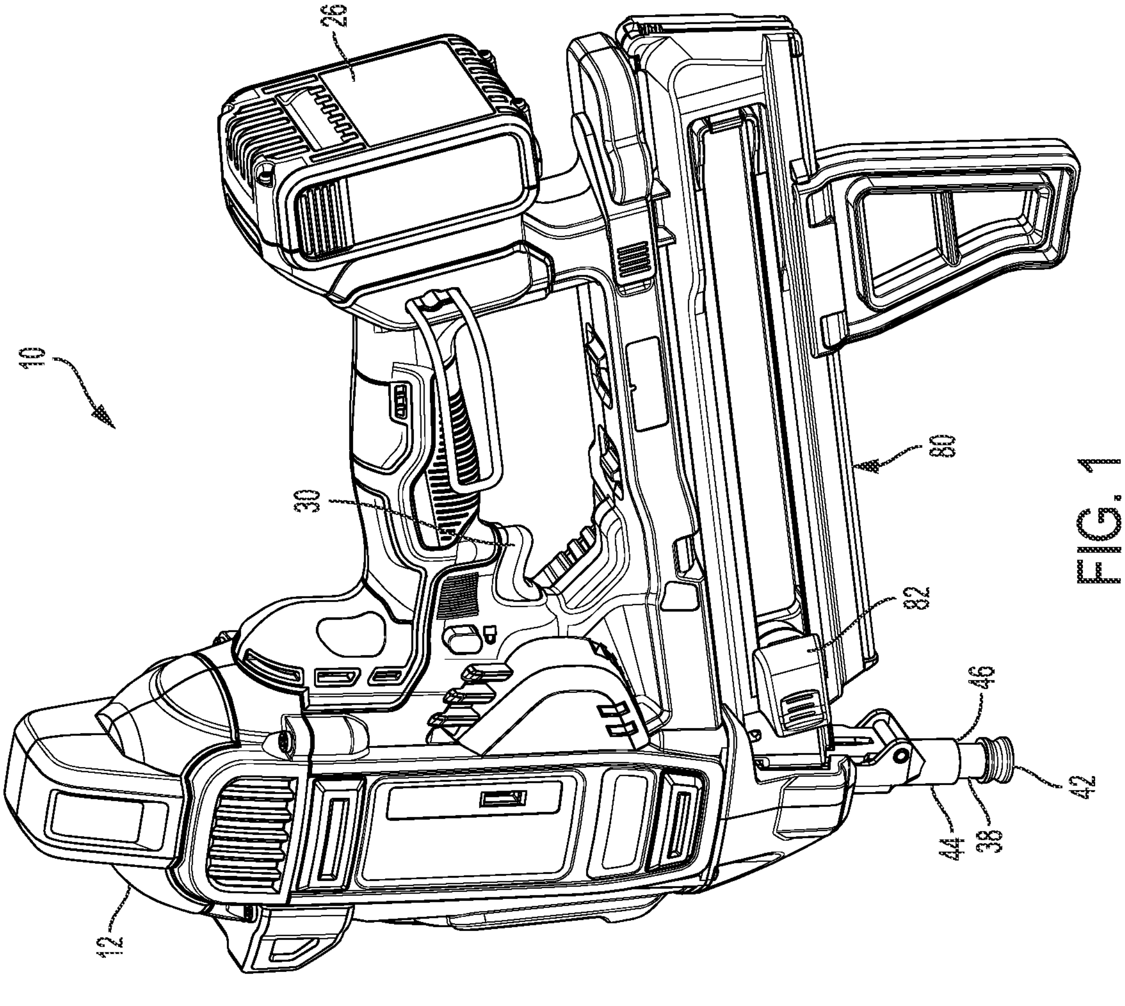
FIG. 1 is a perspective view of one embodiment of a fastening tool of the present invention.
Figure 2:
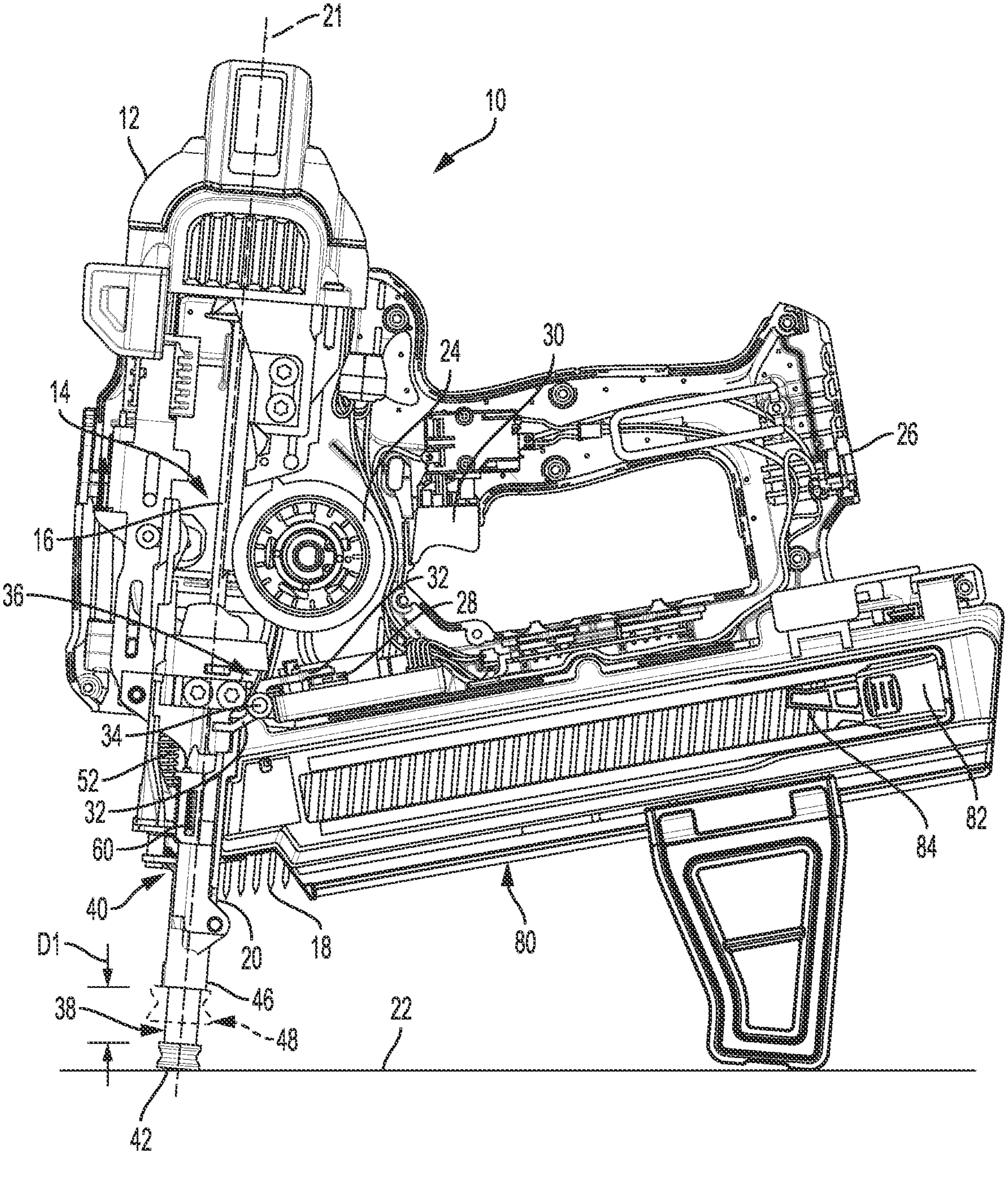
FIG. 2 is an elevational view of the fastening tool of FIG. 1, with portions of the housing removed for clarity, and illustrating the contact trip in its fully-extended position.
Figure 3:
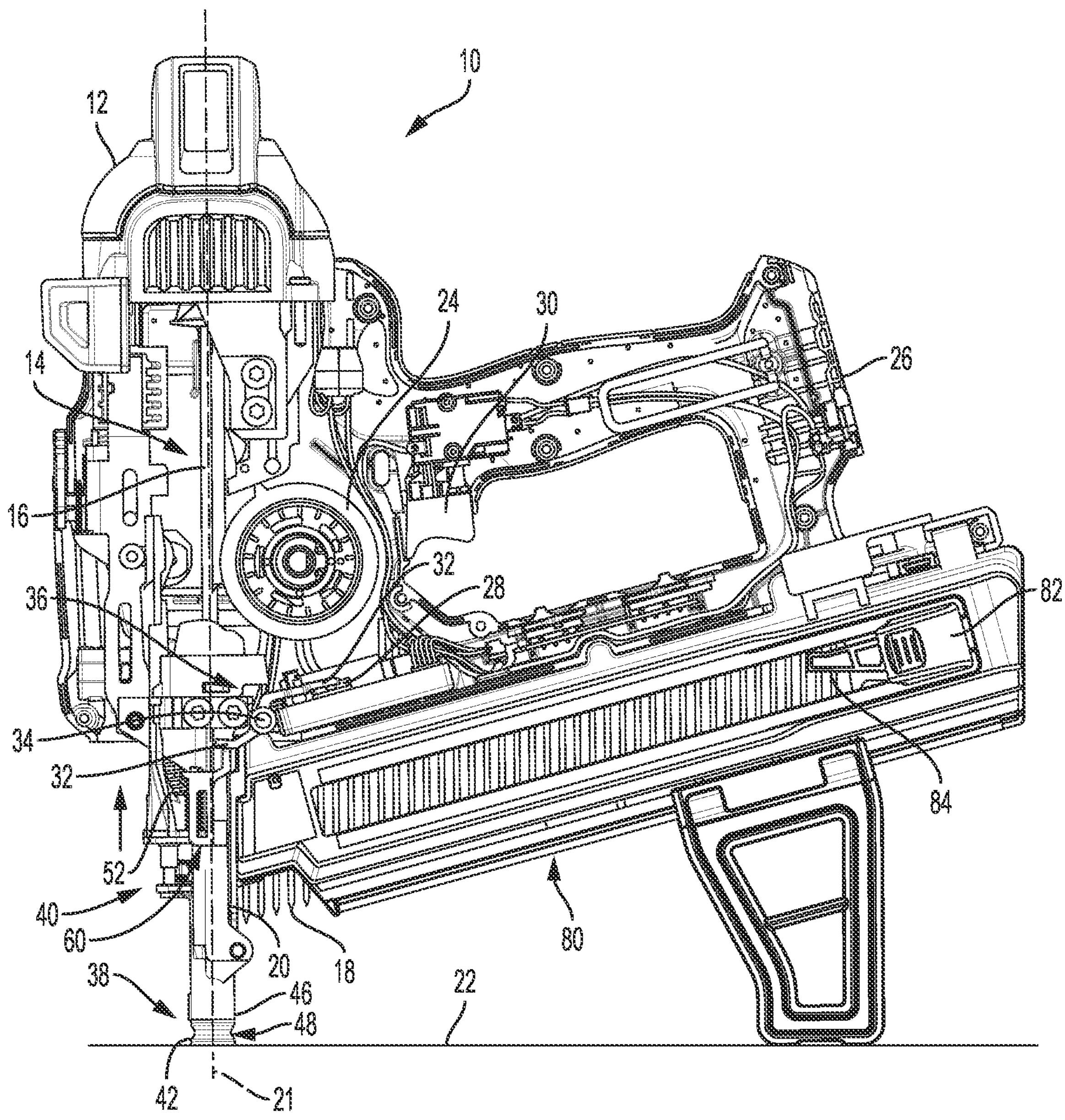
FIG. 3 is a view similar to that of FIG. 2, illustrating the contact trip in its fully-engaged position against a work surface.
Figure 4:
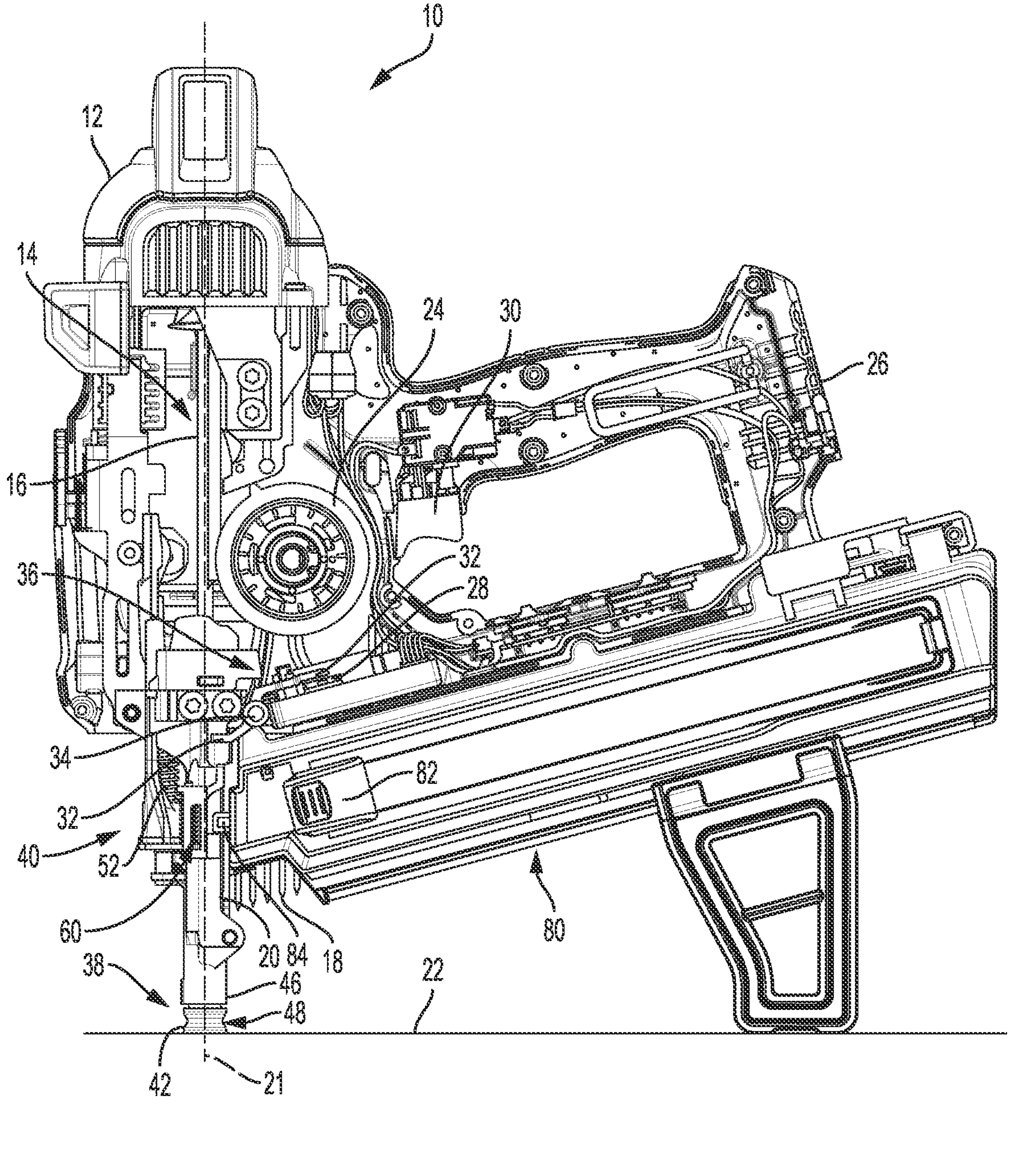
FIG. 4 is a view similar to that of FIG. 3, where a fastener pusher of a magazine is shown blocking a biasing agent housing from engaging a switch lever.

Referring now to the Drawings and particularly to FIGS. 1-4, a fastening tool 10 in accordance with an embodiment of the present invention includes a housing 12 and a fastener drive system 14 disposed in the housing (FIGS. 2-4). The fastener drive system 14 includes a driver 16 for driving fasteners 18 along a drive track 20 and a drive axis 21, and into a work surface 22. The fastener drive system 14 also includes a motor 24 powered by a battery 26 and operatively associated with the driver 16 to drive the fasteners 18. A contact trip switch 28 and a trigger switch 30 are electrically connected to the fastener drive system 14. Both the contact trip switch 28 and the trigger switch 30 must be closed before the fastening tool 10 fires. The contact trip switch 28, which is normally open, is closed in response to movement of a switch lever 32, which is pivotably mounted in the fastening tool housing 12 about a pivot 34. The contact trip switch 28 and switch lever 32 constitute an arming device 36. The arming device 36 is actuated in response to upward movement of a contact trip 38 when the contact trip is pressed against a work surface 22. When the contact trip switch 28 is closed by movement of the contact trip 38, the contact trip switch assumes a firing condition, thereby causing the fastener drive system 14 to be armed. The fastening tool 10 can now drive a fastener 18 when an operator presses the trigger switch 30. If the contact trip 38 does not engage the work surface 22, the contact trip switch 28 remains in a no-fire condition, and pressing the trigger switch 30 will not fire the fastening tool 10.

At this point, it should be noted that, although the embodiments of the fastening tool of the present invention depicted in the Drawings are shown as concrete mailers, it will be appreciated that the present invention can be incorporated in any fastening tool, including, without limitation, staplers and other milers. Furthermore, although the embodiments of the dry-fire bypass system are shown being used in connection with a fastening tool having an electric-powered drive system, it will again be appreciated that the dry-fire bypass system may also be employed in fastening tools using pneumatic, hydraulic, and gas/explosive drive systems, among others.

The main elements of the dry-fire bypass system of the present invention include a contact trip assembly 40, a biasing agent housing assembly 60 and a magazine 80.

Referring now to FIGS. 2, 3, 4, 5A-5D, 6A, 6B, and 7-9, the contact trip assembly 40 includes the contact trip 38, having a contact trip toe 42, which engages the work surface 22. The contact trip 38 is movably disposed within a lower housing member 44, which in turn defines a lower portion 46, against which the contact trip toe 42 abuts when the contact trip reaches a firing position 18, as shown in FIGS. 3, 4, 5C, 5D, 6B, 8 and 9.

Figure 6B:
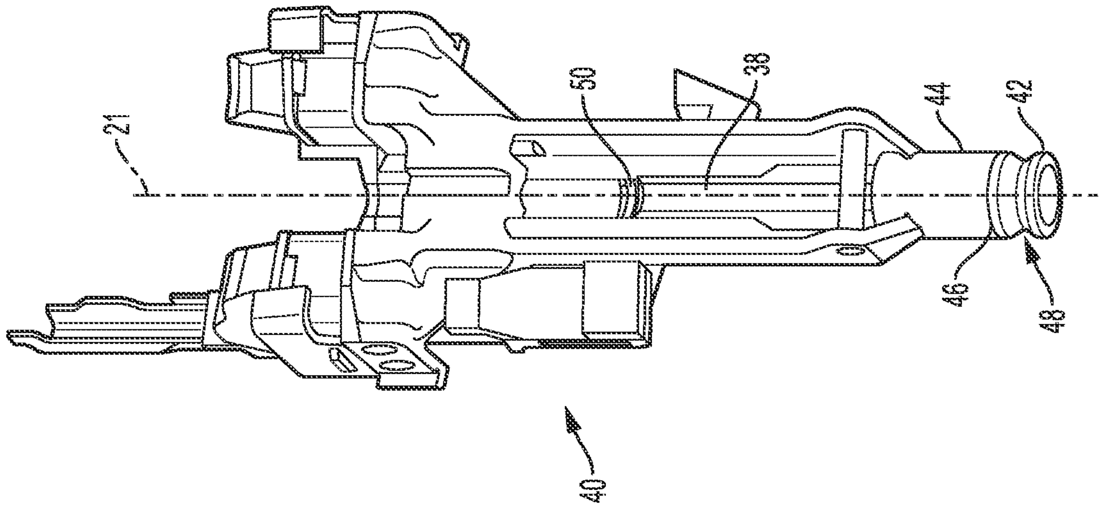
FIGS. 6A and 6B are partial perspective detail views of the contact trip assembly of FIGS. 5A-5D, taken from the rear, and illustrating the joint movement of the contact trip and an appendage.
Figure 6A:
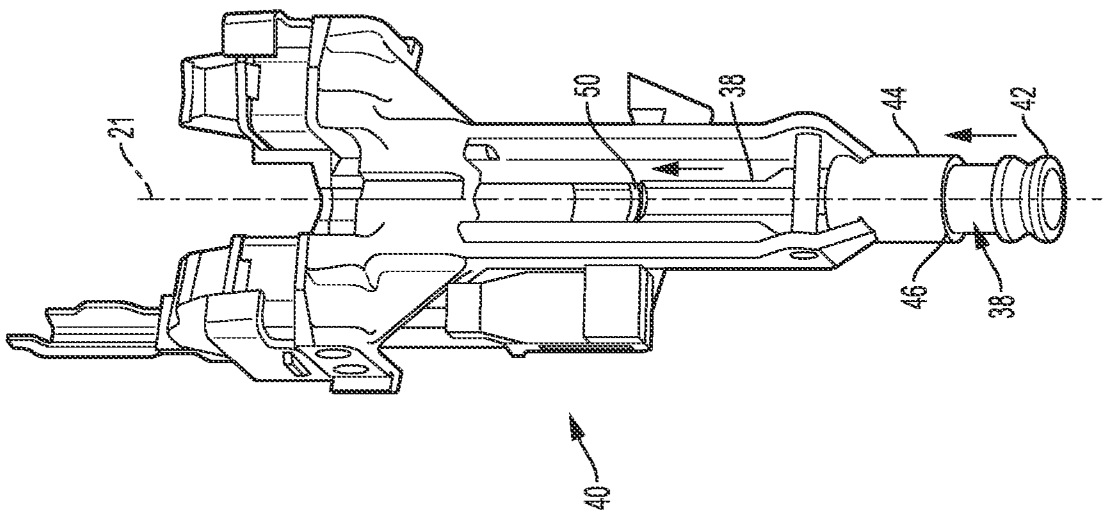

Referring to FIGS. 6A and 6B, the contact trip 38 moves upwardly within lower housing member 44 from a position where the contact trip is not fully engaged, as shown in FIG. 6A, to the contact trip firing position 48, shown in FIG. 6B. A plate or appendage 50 is attached to the contact trip 38 for joint movement with the contact trip.

Returning to FIGS. 5A-5D, a main coil spring 52, grounded at an upper end of the coil spring to the fastening tool housing 12, is connected to the appendage 50. Thus, the main coil spring 52 normally biases the contact trip 38 toward engagement with a work surface 22. It has been discovered that configuring the main coil spring 52 to exert of force of about 1.25 times the weight of the fastening tool 10 achieves the best results. That means a ten-pound fastening tool would require a main coil spring 52 capable of exerting 12.5 pounds of force against the appendage 50 and contact trip 38 combination. Still referring to FIGS. 5A-5D, the appendage 50 is threaded onto a bushing 54, which slides along a bushing rod 56. Thus the appendage 50, main coil spring 52, bushing 54 and bushing rod 56 complete the contact trip assembly 40.

Figure 7:
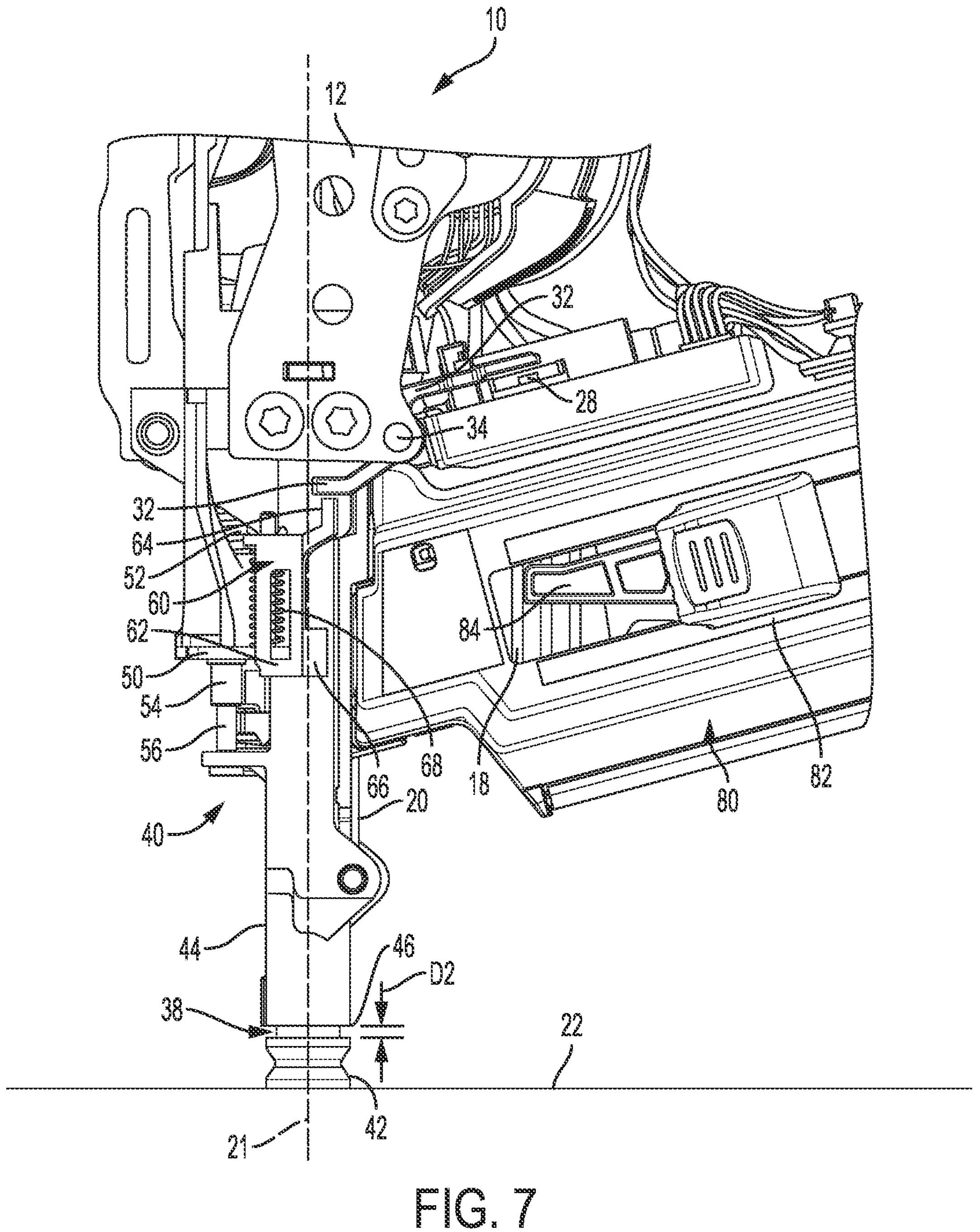
FIG. 7 is a partial elevational detail view, with parts removed for clarity, of the fastening tool of FIG. 1, illustrating the contact trip in the FIG. 5B position.
Figure 8:
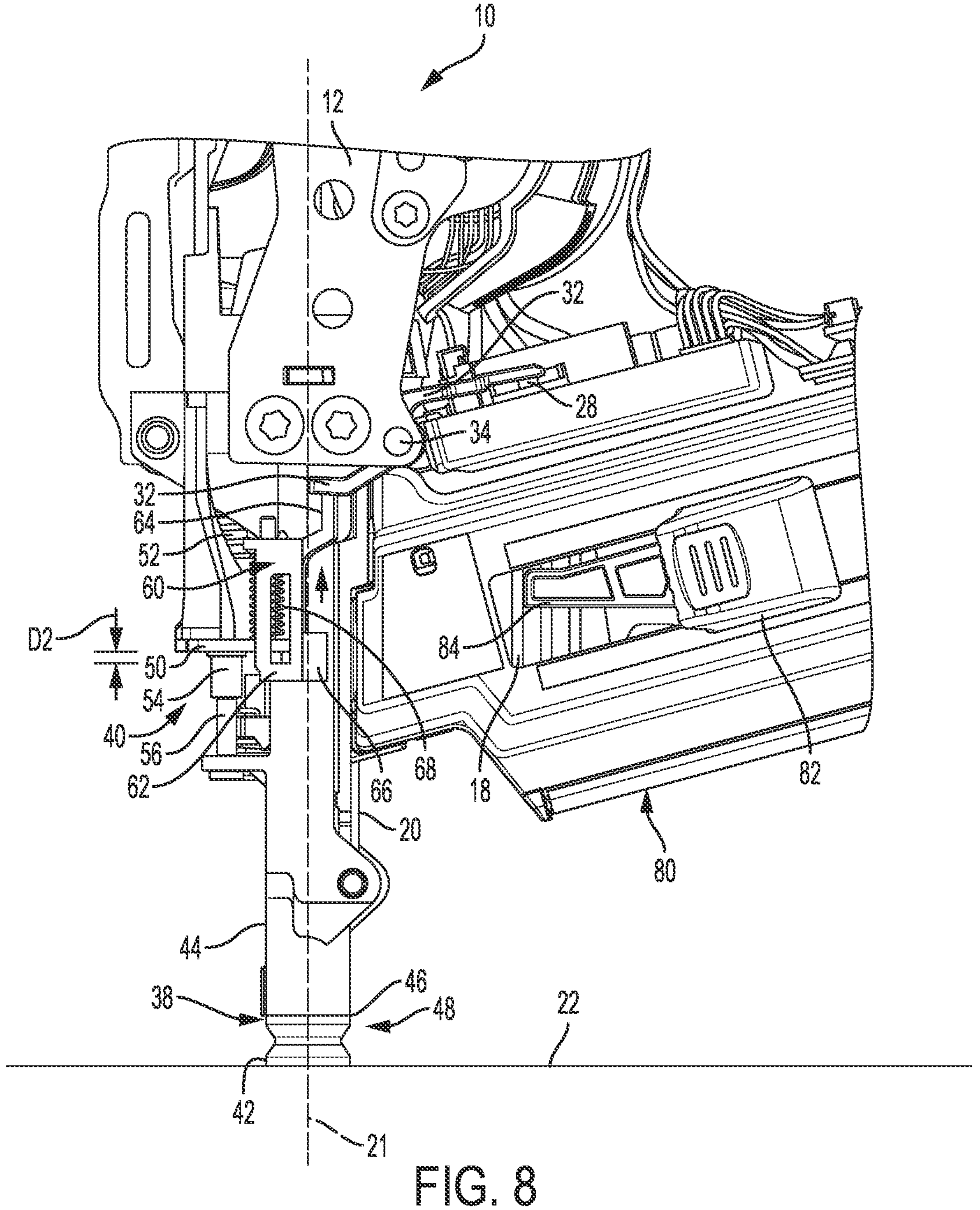
FIG. 8 is a view similar to that of FIG. 7, illustrating the contact trip in the FIG. 5C position.
Figure 9:
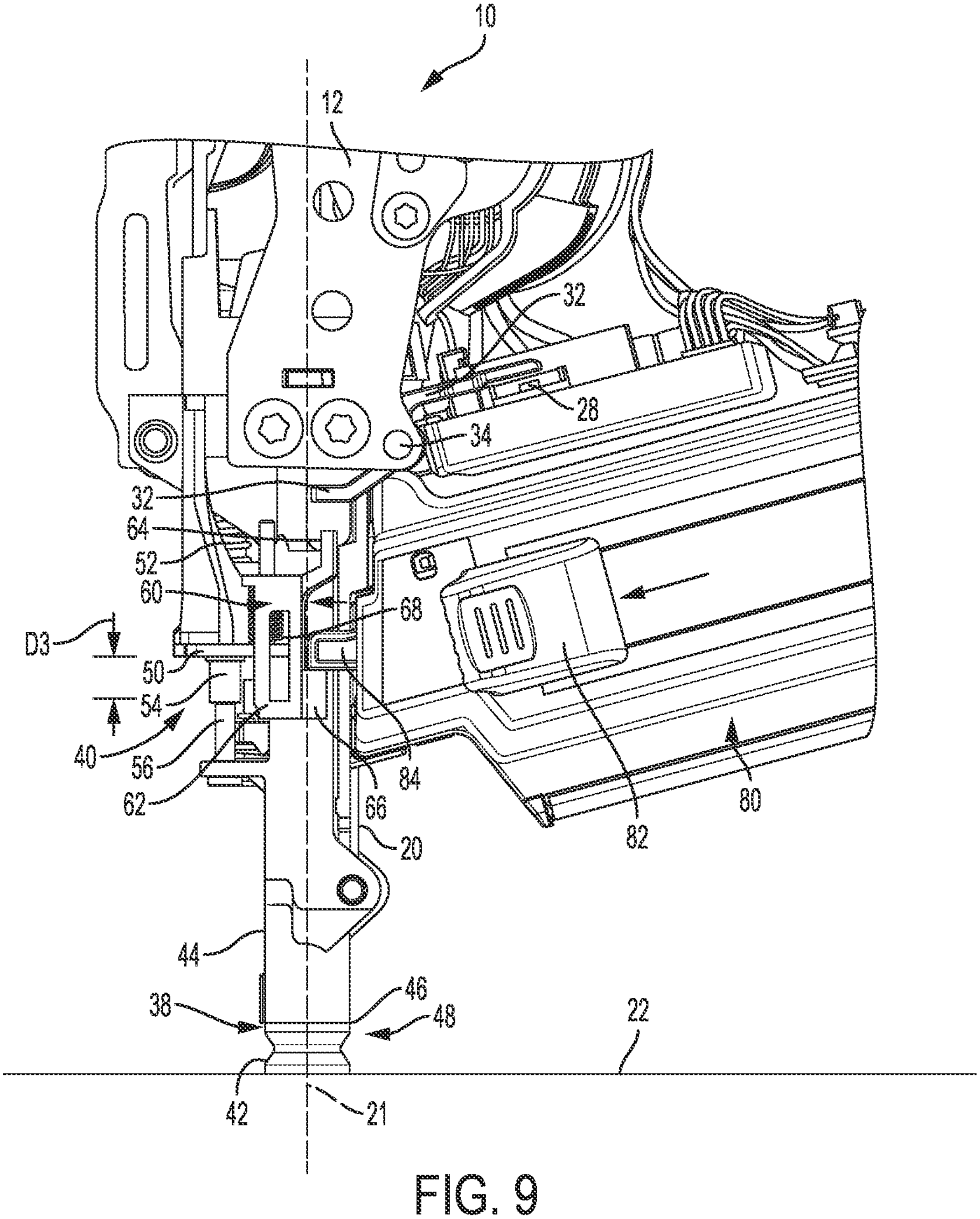
FIG. 9 is a view similar to that of FIG. 7, illustrating the contact trip in the FIG. 5D position.

The biasing agent housing assembly 60 is shown, for example, in FIGS. 7-9, and includes a biasing agent housing 62, a lever-engaging member 64 extending from the biasing agent housing and engageable with the switch lever 32, a blocking member 66, and a biasing agent 68. The biasing agent 68 is disposed in the biasing agent housing 62 between the appendage 50 and an upper surface 70 of the biasing agent housing (see FIGS. 5A-5D). The appendage 50 is movable independently of the biasing agent housing 62 within a slot (not shown) formed on one side of the biasing agent housing. When the appendage 50 moves upwardly in response to movement of the contact trip 38, the appendage pushes the biasing agent 68 upwardly, as well. This in turn pushes the biasing agent housing 62 toward engagement with the switch lever 32, unless movement of the biasing agent housing is blocked. In the embodiment shown in the Drawings, the biasing agent 68 is depicted as a coil spring. However it will be appreciated that the biasing agent 68 may take on other forms and include multiple elements, all of which will work satisfactorily provided they bias the biasing agent housing 62 in the direction of the switch lever 32.

As will be later described in more detail, the biasing agent 68 also takes on the function of a force-limiting or force take-up member, being configured to limit the force that the lever-engaging member 64 exerts upon the switch 28 to two pounds or less, even when an operator slams the contact trip 38 against an unyielding surface like concrete, or when the fastening tool 10 is dropped, nose-first, onto a hard surface.

Moving now to the magazine 80, and again referring to FIGS. 7-9, the magazine contains a supply of fasteners such as nails 18. A fastener pusher 82 is biased to push the nails 18 toward the drive track 20, along which a nail can be driven into a work surface 22 when the fastening tool 10 is fired. As shown in FIG. 9, when the supply of nails 18 reaches a dry-fire condition, for example, when the supply of nails reaches a predetermined minimum quantity, a pusher probe 84 extending from the fastener pusher 82 in the direction of the biasing agent housing 62 engages the blocking member 66, thereby blocking movement of the biasing agent housing 62 toward the lever 32, and thus preventing the fastening tool 10 from firing. The cooperation of the pusher probe 84 and the blocking member 66 can be adjusted so that the movement of the biasing agent housing 62 can be blocked when the remaining quantity of nails in the magazine 80 reaches any desired minimum, for example, from one to three nails. Blocking the movement of the biasing agent housing 62 constitutes a "bypass event", as will be discussed below.

Figures 5A, 5B, 5C, 5D:
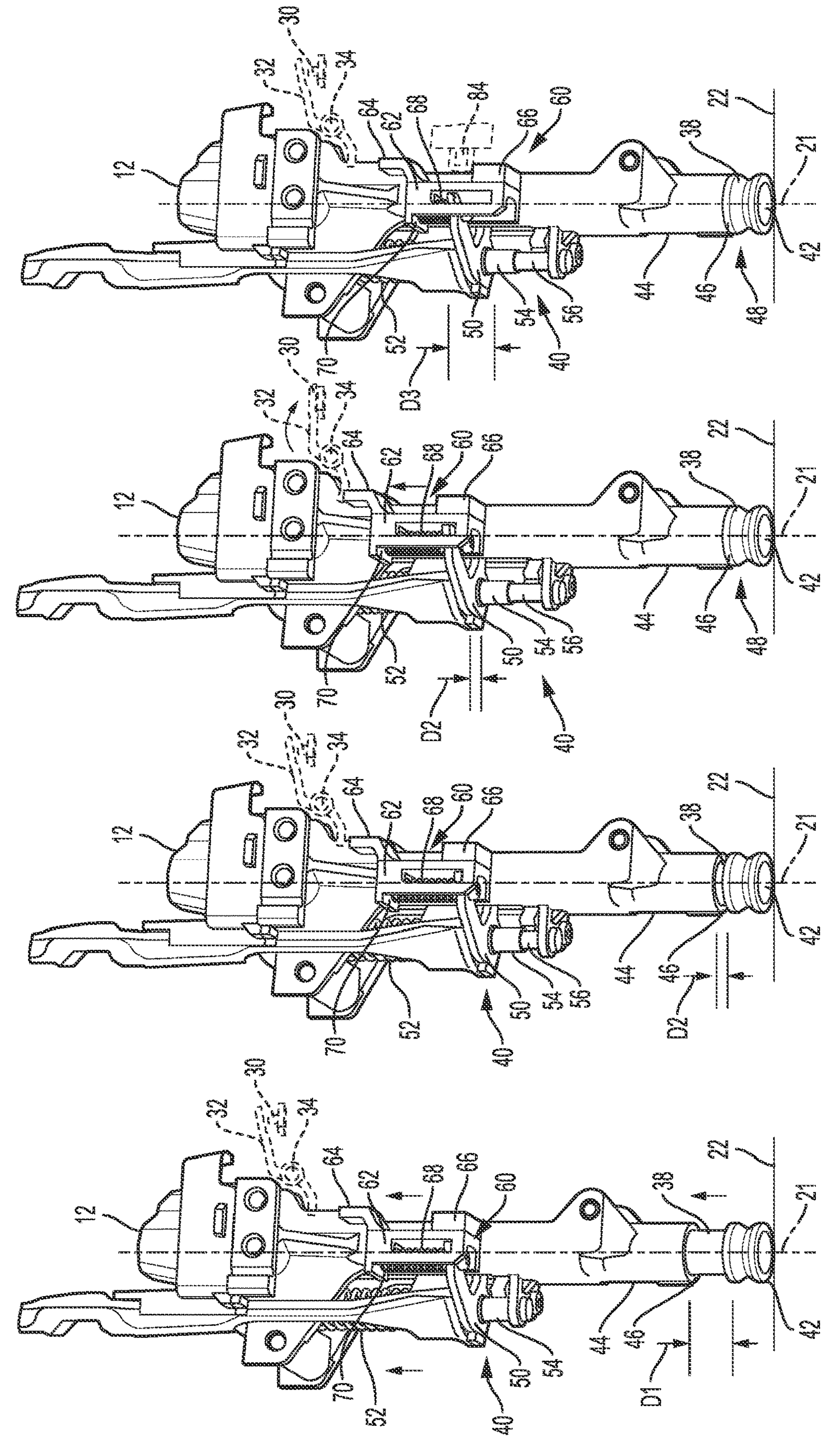
FIGS. 5A-5D are partial perspective detail views of a contact trip assembly responding, respectively, to three different vertical positions of the contact trip, and to a dry-fire condition of the magazine.

The operation of the dry-fire bypass system will be described with reference to FIGS. 5A-5D and 7-9. As shown in FIG. 5A, the contact trip 38 has touched the work surface 22, but no downward force has been exerted on the fastening tool 10 to fully depress the contact trip. Consequently, the toe 42 of the contact trip 38 remains spaced a distance D1 below the lower portion 46 of lower housing member 44. The distance D1 is precisely the amount of distance that the contact trip 38 travels when it moves from the position shown in FIG. 5A to the firing position 48, shown in FIG. 5C. The dry-fire bypass system will take up or absorb the entire distance D1, so that the effect of an upward movement of the contact trip will not be expended upon the contact trip switch 28. At the stage shown in FIG. 5A, the appendage 50 is located at its lowermost position, as is the biasing agent housing 62, inasmuch as the appendage 50 has yet to move the coil spring 68 upwardly against the upper surface 70 of the biasing agent housing.

As shown in FIGS. 5B and 7, the contact trip 38 has moved upwardly (see arrows in FIG. 5A), causing the appendage 50 to move the coil spring 68 upwardly, which in turn has caused the biasing agent housing 62 to move upwardly by the same amount, so that the lever-engaging member 64 is almost touching the lever 32. At this point, the contact trip toe 42 is only a small distance D2 from the lower portion 46 of the lower housing member 44. However, when the contact trip 38 reaches the firing position 48 shown in FIG. 5C, the incremental amount of upward movement D2 by the contact trip (and therefore the appendage 50) to the FIG. 5C position now causes the biasing agent housing 62 to engage lever 64 to close the contact trip switch 28. The contact trip switch 28 has thus assumed the firing condition, and the fastener drive system 14 is now armed.

FIGS. 5C and 8 show that, simultaneously with the upward movement of the contact trip 38, the appendage 50 moves upwardly by the same incremental amount D2, thereby slightly compressing the coil spring 68 within the biasing agent housing 62. The coil spring 68 has therefore taken up or absorbed the incremental amount of distance traveled by the contact trip 38 in ultimately reaching the firing position 48. In so doing, the coil spring 68 has assumed the role of a distance take-up member, responding to another type of bypass event, namely, the incremental movement of the contact trip 38 beyond a predetermined distance, which movement would otherwise exert a force greater than two pounds on the contact trip switch 28. Thus, the coil spring 68 has also acted to limit or take up the force exerted by the lever-engaging member 64 upon the fastener drive system arming device switch lever 32 and contact trip switch 28). As can now be appreciated, the force-limiting action is consequently not limited to a dry-fire condition, but protects the arming device 36 even when the magazine 80 is loaded with fasteners 18.

The bypass arrangement of the present invention, in contrast to conventional dry-fire avoidance systems, allows the contact trip 38 to be disposed coaxially with the drive axis 21, thereby enabling a hard stop for the contact trip 38 to be located right at the lower portion 46 or base of the lower housing member 44. Accordingly, in the event the contact trip 38 is slammed against an unyielding surface, the hard stop dissipates the shock of the impact of the contact trip toe 42 throughout the inherently rugged housing 12 of the fastening tool 10, simultaneously with the coil spring 68 limiting the force which is ultimately applied to the contact trip switch 28.

After the fastening tool 10 has been lifted from the work surface 22, and in the absence of a dry-fire condition, the coil spring 68 returns to a relaxed condition, inasmuch as the contact trip 38 is biased by the main spring 52 normally to extend outwardly or downwardly from the fastening tool housing 12, thereby returning the appendage 50 to the position shown in FIG. 5A.

An example of the bypass action (or distance and force take-up) of the coil spring 68 is exhibited in the case of a dry-fire bypass event. In response to the quantity of remaining fasteners 18 in the magazine 80 having reached a minimum, the magazine pusher probe 84 cooperates with the blocking member 66 to block upward movement of the biasing agent housing 62, as shown in FIGS. 5D and 9. Here, although the biasing agent housing 62 has been rendered immobile, the contact trip 38 is still allowed to travel all of the way to the firing position 48. That is because the appendage 50, being movable independently of the biasing agent housing 62, is able to compress the coil spring 68 within the biasing agent housing 62 by an amount D3 to the position shown in FIGS. 5D and 9. The coil spring 68 thus takes up or absorbs all of the distance traveled by contact trip 38 in reaching the firing position 48. Consequently, movement of the contact trip 38 during the bypass event has effectively bypassed contact trip switch 28, which remains in the no-fire condition.

Figure 10:
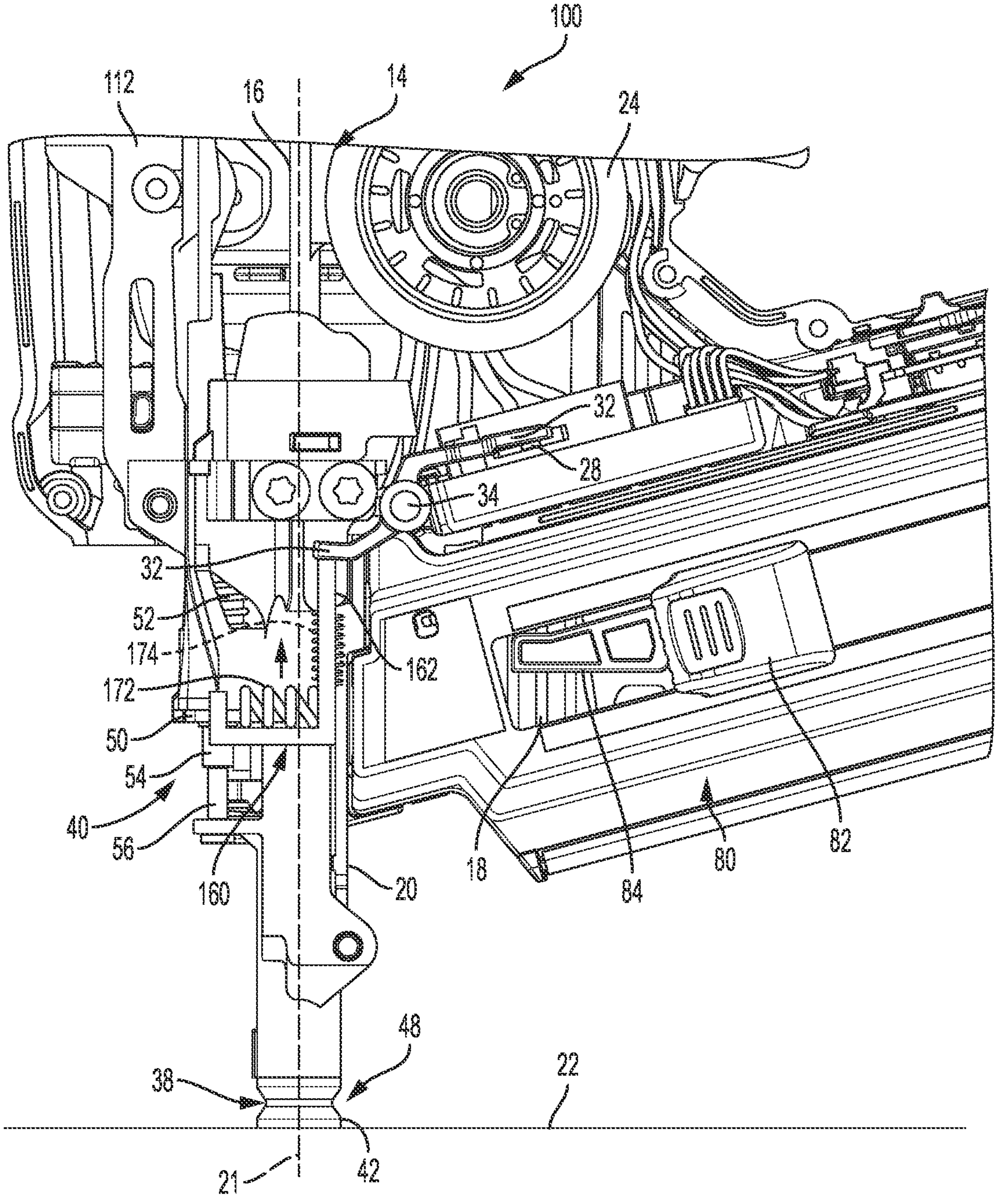
FIG. 10 is a view similar to that of FIG. 8, illustrating another embodiment of the fastening tool of the present invention.
Figure 11:
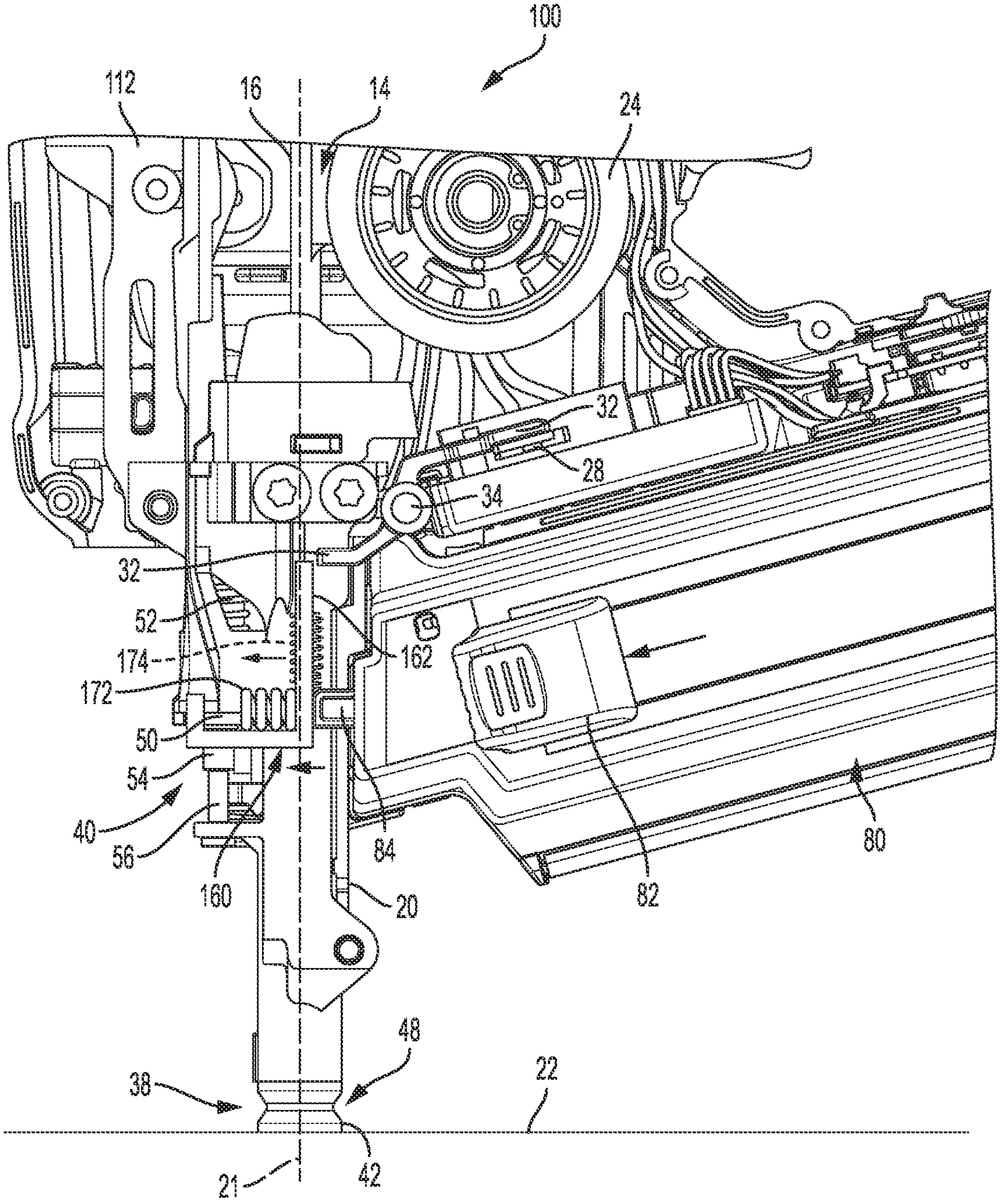
FIG. 11 is a view similar to that of FIG. 10, illustrating a fastener pusher causing the biasing agent housing of the embodiment of FIG. 10 to bypass the switch lever.

Another embodiment of the present invention 100 is shown in FIGS. 10 and 11. In this embodiment, a fastening tool 100 is disclosed. All of the elements of the fastening tool 10 of the present invention remain the same, except for a biasing agent housing 160, which is disposed on the appendage 50 for movement generally transverse to the direction of the movement of the appendage (which still moves vertically with the movement of the contact trip 38). The biasing agent housing 160 includes a vertical arm 162, which is aligned with the switch lever 32 so that upward movement of the biasing agent housing 160 will cause the vertical arm 162 to engage the switch lever. A biasing agent housing return spring 172 connected between the appendage 50 and the biasing agent housing 160 normally biases the biasing agent housing to the position shown in FIG. 10. If desired, a force take-up member or coil spring 174 (shown in phantom in FIGS. 10 and 11) may be operatively disposed between the biasing agent housing 160 and the appendage 52 to limit the force applied to the contact trip switch 28 to two pounds or less, as is similarly performed by the coil spring 68 in the first embodiment of the fastening tool 10. In operation, as shown in FIG. 10, when the contact trip 38 reaches the firing position 48, the appendage 50 moves the biasing agent housing 160 upwardly (as shown by the arrow) so that the biasing agent housing directly engages the lever 32 to close the contact trip switch 28, thereby placing the contact trip switch in the firing condition.

When a dry-fire bypass event occurs, as shown in FIG. 11, the pusher probe 84 pushes the vertical arm 162 of the biasing agent housing 160 horizontally away from alignment with the switch lever 32, as indicated by the arrows. Consequently, even if the contact trip 38 is pushed to the firing position 48, thereby moving the appendage 58 vertically a distance that would normally engage the switch lever 32 and close the contact trip switch 28, the vertical arm 162 of the biasing agent housing 160 completely misses or bypasses the switch lever 32, and the contact trip switch remains in the no-fire condition.

It can now be seen that the two embodiments of the fastening tool 10, 100 provide a method both for bypassing the fastener drive system arming device 36 during a dry-fire condition, and for limiting the force applied to the contact trip switch 28 as the contact trip 38 reaches the firing position 48, even when the magazine 80 is loaded with fasteners 18.

While the present invention has been described with respect to various embodiments of a concrete nailer, the present invention may be further modified within the spirit and scope of this disclosure to apply to other products as well. This application is therefore intended to cover any variations, uses, or adaptations of the present invention using its general principles. Further, this application is intended to cover such departures from the present disclosure as come within known or customary practice in the art to which this invention pertains and which fail within the limitations of the appended claims.

What is claimed is:

1. A method of limiting the force applied to a contact trip switch by a contact trip of a fastening tool having a fastener drive system, as the contact trip moves toward a firing position closing the contact trip switch, comprising:
- providing a contact trip switch electrically connected to the fastener drive system;
- providing a biasing agent including a coil spring configured to limit the maximum force exerted upon the contact trip switch to less than two pounds;
- transmitting the force applied by the contact trip to the contact trip switch via the biasing agent; and
- limiting movement of the contact trip beyond a predetermined distance that corresponds to a force greater than a predetermined force for activating the contact trip switch via the biasing agent.

2. The method claimed in claim 1, wherein the biasing agent is disposed in a biasing agent housing between the contact trip and a surface of the biasing agent housing, wherein the biasing agent biases the biasing agent housing toward engagement with a lever operatively associated with contact trip switch, and wherein the biasing agent housing closes the contact trip switch when the contact trip reaches the firing position.

3. The method claimed in claim 2, wherein the biasing agent housing is movable independently of the contact trip, and wherein the biasing agent takes up at least a portion of the force exerted by the contact trip upon the contact trip switch as the contact trip moves toward the firing position.

4. A method of limiting the force applied to a contact trip switch by a contact trip of a fastening tool as the contact trip moves toward a firing position closing the contact trip switch, comprising:

transmitting the force applied by the contact trip to the contact trip switch via a biasing agent, wherein the biasing agent is disposed in a biasing agent housing between the contact trip and a surface of the biasing agent housing, wherein the biasing agent biases the biasing agent housing toward engagement with a lever operatively associated with contact trip switch, wherein the biasing agent housing closes the contact trip switch when the contact trip reaches the firing position, wherein the biasing agent housing is movable independently of the contact trip, wherein the biasing agent takes up at least a portion of the force exerted by the contact trip upon the contact trip switch as the contact trip moves toward the firing position, and wherein the biasing agent includes a coil spring configured to limit the maximum force exerted upon the contact trip switch to two pounds.

5. A fastening tool, comprising:

a housing;

a fastener drive system disposed in the housing and including a driver for driving fasteners along a drive axis into a work surface;

a fastener pusher biased to push the fasteners toward the fastener drive system;

an arming device having a contact trip switch electrically connected to the fastener drive system, the contact trip switch having a no-fire condition preventing the drive system from firing and having a firing condition enabling the drive system to be fired;

a contact trip movably connected to the housing and engageable with the work surface;

a biasing agent housing linearly and movably disposed in the housing in the direction of the drive axis, and operatively associated with the contact trip and the arming device, the biasing agent housing biased to be engageable with the arming device;

a biasing agent within the biasing agent housing and movable independently of the biasing agent housing; and a main spring connected to the housing and biasing the contact trip into engagement with the work surface, wherein the contact trip is movable to a firing position in response to engagement with the work surface, wherein the biasing agent housing is engageable with the arming device to cause the arming device to assume the firing condition when the contact trip reaches the firing position, and wherein in a bypass event, the biasing agent housing is rendered immobile by engagement with the fastener pusher, and remains linearly disposed in the direction of the drive axis, and the biasing agent is compressed to permit the contact trip to move to the firing position without placing the arming device in the firing condition.

6. The fastening tool claimed in claim 5, wherein the bypass event is a predetermined number of fasteners in the magazine.

7. The fastening tool claimed in claim 5, further comprising:

an appendage connected to the contact trip; and a biasing agent disposed in the biasing agent housing between the appendage and a surface of the biasing agent housing, the biasing agent biasing the biasing agent housing toward engagement with the arming device, wherein the biasing agent is movable toward the arming device in response to movement of the appendage, and wherein the biasing agent housing places the arming device in the firing condition, responsive to movement of the biasing agent.

8. The fastening tool claimed in claim 7, wherein the biasing agent includes a coil spring, wherein the bypass event blocks movement of the biasing agent housing, wherein the appendage compresses the coil spring, and wherein the contact trip can thereby move to the firing position without the contact trip causing the arming device to be placed in the firing condition.

9. The fastening tool claimed in claim 8, wherein, in response to the bypass event, the coil spring takes up the distance traveled by the contact trip in reaching the firing position, wherein the arming device includes a switch lever and a contact trip switch disposed in the fastening tool housing, wherein the switch lever is engageable by the biasing agent housing and is pivotably mounted on the fastening tool housing, and wherein the contact trip switch is closed when the biasing agent housing engages the switch lever.

10. The fastening tool claimed in claim 9, further comprising:

a fastener magazine connected to the fastening tool housing, the fastener magazine including a pusher to push fasteners toward the drive system, wherein the pusher includes a probe engageable with the biasing agent housing to block movement of the biasing agent housing in response to the bypass event, and wherein the bypass event includes a supply of fasteners in the fastener magazine having reached a minimum quantity.

11. The fastening tool claimed in claim 5, further comprising:

an appendage connected to the contact trip, wherein the biasing agent housing is movable on the appendage in a direction generally transverse to the direction of movement of the appendage in response to a bypass event, and wherein the biasing agent housing bypasses the arming device.

12. The fastening tool claimed in claim 11, further comprising:

a fastener magazine connected to the fastening tool housing and including a fastener pusher disposed in the magazine, the fastener pusher engageable with the biasing agent housing, wherein the bypass event includes the supply of fasteners in the fastener magazine having reached a minimum quantity, and wherein the fastener pusher prevents the biasing agent housing from engaging the arming device.

13. The fastening tool claimed in claim 12, further comprising:

a force take-up member operatively associated with the biasing agent housing and the appendage to limit the force applied to the arming device as the contact trip moves toward the firing position.

14. A method of limiting the force applied to a contact trip switch by a contact trip of a fastening tool as the contact trip moves toward a firing position closing the contact trip switch, comprising:

providing a biasing agent including a coil spring configured to limit the maximum force exerted upon the contact trip switch to two pounds; and transmitting the force applied to the contact trip switch by the contact trip via the biasing agent.

15. A method of limiting the force applied to a contact trip switch by a contact trip of a fastening tool, as the contact trip moves toward a firing position closing the contact trip switch, the fastening tool having a fastener drive system disposed in a tool housing, the fastener drive system defining a drive axis, the method comprising:

providing a contact trip switch electrically connected to the fastener drive system;

movably disposing the contact trip within the tool housing coaxial with the drive axis;

providing a biasing agent including a coil spring configured to limit the maximum force exerted upon the contact trip switch to less than two pounds; and transmitting the force applied by the contact trip to the contact trip switch via the biasing agent.

* * * * *